Patented Oct. 19, 1926.

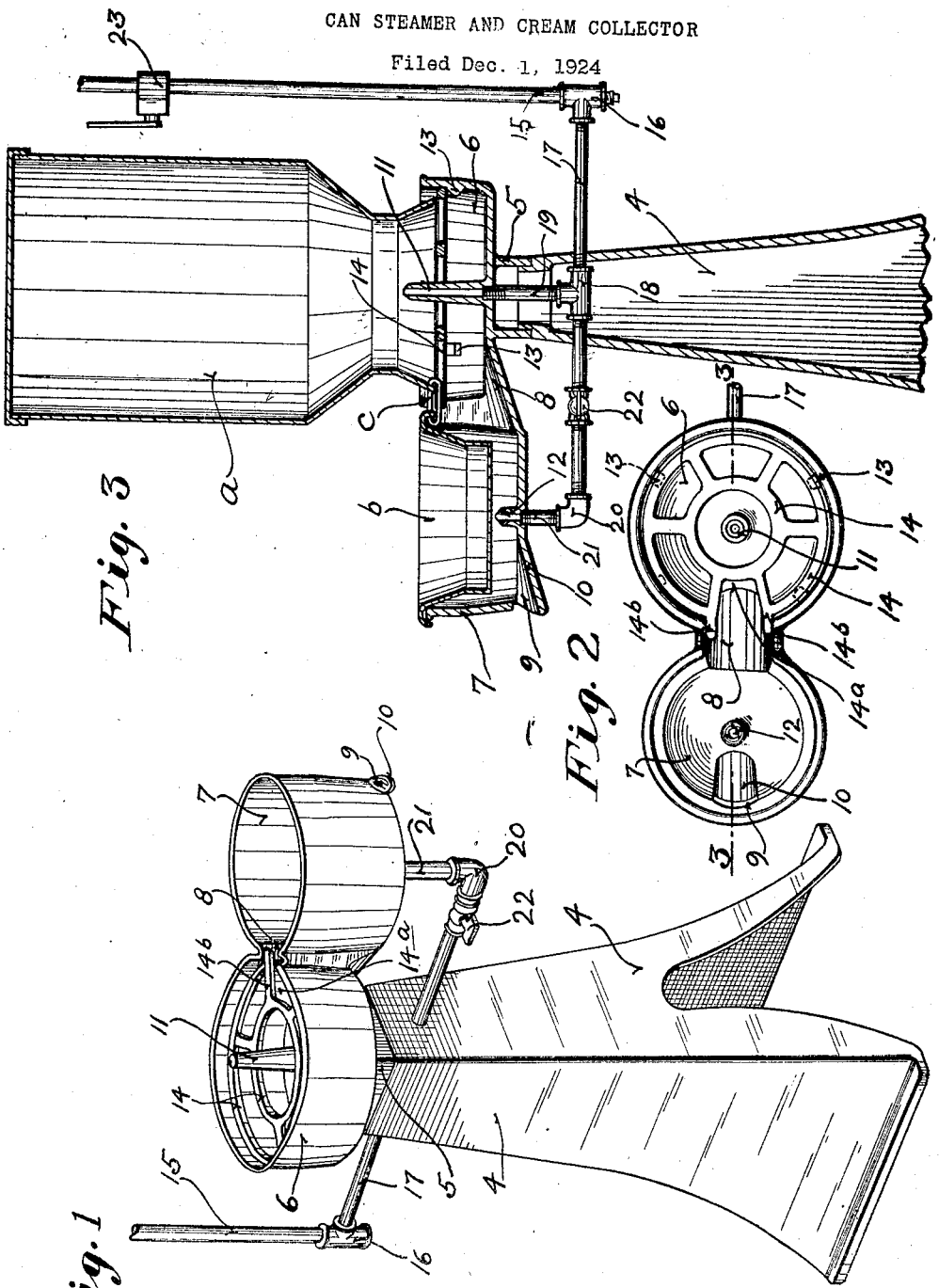

1,603,770

UNITED STATES PATENT OFFICE.

JOHN E. HOGANDER, OF MINNEAPOLIS, MINNESOTA.

CAN STEAMER AND CREAM COLLECTOR.

Application filed December 1, 1924. Serial No. 753,180.

My invention provides an improved can steamer and cream collector and, generally stated, it consists of the novel construction, combinations and arrangements of parts hereinafter described and defined in the claims.

This steamer is designed for use to simultaneously steam milk or cream cans and their covers and to collect the precipitated cream. It is a well known fact that a very considerable amount of cream will adhere to the interiors of cream and milk cans and to the bottom surfaces of the covers and that the cream thus adhering may be dissolved or reduced to very fluid condition, so that it will run into an underlying basin and, hence, may be reclaimed and saved; but in prior devices, separate operations were required to reclaim the cream from the can and from the cover. My invention provides a device in which the can and cover may be simultaneously applied and steamed so that the cream may be simultaneously removed from both can and cover. Incidentally, of course, these steaming operations sterilize and clean the cans.

The invention is illustrated in the accompanying drawings, wherein like characters indicate like parts throughout the several views.

Referring to the drawings:

Fig. 1 is a perspective view, showing the improved device;

Fig. 2 is a plan view of the same; and

Fig. 3 is a vertical section taken on the line 3—3 of Fig. 2, some parts being shown in full.

The character $a$ indicates an ordinary milk or cream can, and the character $b$ the cover thereof, which latter, as shown, is loosely hinged to the neck of the can by a link $c$. Usually, the covers are thus attached to the can to prevent displacement thereof, but sometimes they have no mechanical connection.

The numeral 4 indicates a hollow cast pedestal, the upper end of which, as shown, is formed with a reduced end onto which is telescoped a depending sleeve 5 of a bowl 6, preferably of cast metal. This main bowl is cast integral with an auxiliary or secondary bowl 7, the adjoining sides of the two bowls being connected by a trough-like portion 8, the bottom of which is inclined so that liquids will run from the main bowl into the auxiliary bowl. The auxiliary bowl, on the side away from the bowl 6, has a discharge passage 9 and an underlying inclined discharge spout 10. The main bowl 6, at its axis, has an upstanding steam discharge nozzle 11 and the auxiliary bowl 7, at its axis, has a smaller upstanding steam discharge nozzle 12. The bowl 6 has an internal ledge, shown as afforded by lugs 13, located below its top, and on this ledge is detachably seated a can-supporting grid 14. The grid 14, as best shown in Fig. 2, loosely but quite closely fits the interior of the bowl 6 and is formed with a large peripheral notch $14^a$ and with outstanding aligning lugs $14^b$. When the grid is applied, its central opening very freely surrounds the nozzle 11, the notch $14^a$ overlies the inclined trough 8, and the lugs $14^b$ engage the edge of the opening formed in the bowl 6 and thereby hold said grid against rotation with its notch $14^a$ in position to clear the can and cover-connecting link $c$.

Steam for heating and moistening the interior of the can and bottom surface of the cover may be supplied from any suitable source, as from a steam supply pipe 15, which, by a coupling 16, is connected to horizontal steam pipe 17 that is extended through the upper portion of the pedestal. The pipe 17, within the pedestal, is shown as provided with an interposed T-coupling 18, which, by a short vertical pipe 19, is connected to the lower portion of the nozzle 11. The extended end of the pipe 17 is connected by a coupling 20 and short pipe 21 to the steam nozzle 12. The numeral 22 indicates an ordinary cut-off or steam-regulating valve interposed in that portion of the pipe 17 that is between the couplings 18 and 20. The numeral 23 indicates a cut-off or steam-regulating valve applied in the steam pipe 15.

When the can with an attached cover, such as illustrated, is to be treated for the purpose of removing the cream from the interior thereof, it will be inverted and placed with its neck upon the grid 14 and its cover will be placed with its rim on the edge of the auxiliary bowl 7. Even if the cover were not mechanically attached to the can, both the can and cover should be simultaneously applied, as illustrated in the drawings, Fig. 3. By adjustments of the valve 23, the proper total amount of steam may be regulated, and by adjustments of the valve 22, the proper relative amounts of steam delivered to the nozzles 11 and 12 may be regulated. Obviously, greater discharge of steam will be required within the inverted can than will be required against the bottom of the cover, in order to loosen up and remove the cream therefrom. The arrangement of valves described provides for just the desired distribution of the steam. Of course, if desired, the valve 22 can be closed when only cans are to be steamed.

The action of steam on these cans and covers is well known. It dissolves and melts the cream, reducing it to liquid form and causing it to run from the can into the bowl 6 and from the cover into the bowl 7. The cream from the bowl 6 will run into the bowl 7 and from thence, with the other precipitated cream, will be delivered by the spout 10 into a suitable receptacle, such as a pail or can set below the said spout. When the grid 14 is removed, the bowls may be very readily cleaned and, hence, easily kept in sanitary condition.

It is important to note that the steam nozzle 11 projects upward through and terminates above the grid 14, so that the steam will be better delivered into the inverted can, and it should be further noted that the rim of the secondary bowl 7 is of such size that the outturned flange of the cover will seat itself on the rim of said bowl and thus form a quite close joint therewith.

The device described has, in practice, been found to be very highly efficient for the purposes had in view. As is evident, when the steam pipes are connected to the pedestal and to the bowls, as described, said bowls will be securely held on the pedestal and when the pipes are uncoupled, the bowls may be freely removed from the pedestal for the purpose of packing and shipping.

What I claim is:

1. A device of the kind described comprising a pedestal, a main bowl secured on said pedestal, an auxiliary bowl connected to said main bowl by an inclined trough, whereby the main bowl will deliver into said auxiliary bowl, the latter having a discharge passage through which the drippings from both bowls will be discharged, the said two bowls having upwardly discharging steam nozzles, and open steam supply connections to said nozzles.

2. The structure defined in claim 1 in which there is a valve in the connections between the two nozzles for regulating the proportionate discharge of steam from the two nozzles.

3. The structure defined in claim 1 in which the main bowl is provided with a depending member detachably and telescopically connected to the pedestal, and in which the steam supply connections are anchored in respect to the pedestal and secured to the main bowl for holding said bowl against removal from the pedestal.

4. The structure defined in claim 1 in further combination with a can-supporting grid located in the main bowl above the bottom thereof, said grid being provided with a notch in line with the trough connecting the two bowls and being provided with outstanding lugs that engage the said trough and hold the said grid against rotation.

In testimony whereof I affix my signature.

JOHN E. HOGANDER.